(12) United States Patent
Miller et al.

(10) Patent No.: US 6,177,016 B1
(45) Date of Patent: Jan. 23, 2001

(54) WATER PURIFICATION METHODS WITH IN SITU GENERATION OF METAL HYDROXIDE FLOCCULANTS

(75) Inventors: Jorge Miller; Luisa Kling Miller, both of Houston, TX (US)

(73) Assignee: Potable Water Systems, Ltd., Houston, TX (US)

( * ) Notice: Under 35 U.S.C. 154(b), the term of this patent shall be extended for 0 days.

(21) Appl. No.: 09/361,765

(22) Filed: Jul. 27, 1999

(51) Int. Cl.$^7$ .................................. C02F 1/70; C02F 3/04
(52) U.S. Cl. .................... 210/721; 210/722; 210/758; 210/767; 210/807
(58) Field of Search ................... 210/717, 721, 210/722, 738, 723, 758, 807, 759, 760, 776, 800, 804, 767

(56) References Cited

U.S. PATENT DOCUMENTS

| | | | |
|---|---|---|---|
| 4,094,755 | * 6/1978 | Moeglich | 210/704 |
| 4,802,991 | 2/1989 | Miller | 210/705 |
| 5,289,922 | * 3/1994 | Inculet et al. | 209/127.1 |
| 5,558,755 | 9/1996 | Gardner-Clayson | 205/753 |
| 5,575,919 | * 11/1996 | Santina | 210/721 |
| 5,879,555 | * 3/1999 | Khudenko | 210/631 |

* cited by examiner

Primary Examiner—Chester T. Barry
(74) Attorney, Agent, or Firm—Shook, Hardy&Bacon L.L.P.

(57) ABSTRACT

The present invention is directed to methods for purifying wastewater, including water which may or may not contain fatty acids or oils, by producing in situ a hydrophobic flocculant including a water-insoluble metal hydroxide. In the preferred methods, metallic cations are produced by the gradual dissolution of consumable, similar metal sources, preferably, a fluidized bed of metallic particles. The motion of the particles of the fluidized bed maintains the surfaces thereof clean of oxides and other contaminants in order to facilitate the gradual dissolution thereof. Oxidation of the dissolved cations to form the water-insoluble metal hydroxide is achieved by flowing an oxidizing agent, e.g., air or pure oxygen, through the system. Contaminants are entrapped and removed within the insoluble flocculants, including the water-insoluble metal hydroxide and, optionally, metallic soaps which are formed in the presence of fatty acids. Thus, clean, contaminant-free water may be separated and removed from the insoluble flocculants and entrapped contaminants.

19 Claims, 1 Drawing Sheet

WATER PURIFICATION METHODS WITH IN SITU GENERATION OF METAL HYDROXIDE FLOCCULANTS

BACKGROUND OF THE INVENTION

I. Field of the Invention

The present invention generally relates to processes for purifying contaminated water. The present invention provides methods for purifying water, which may or may not contain long-chain organic acids, e.g., fatty acids, and oils. More specifically, the present invention is directed to methods for purifying contaminated water, e.g., waters containing suspended organic colloidal emulsions or suspensions such as effluents from meat processing plants, dairies, cheese processing plants, bakeries, chemical plants and petroleum plants and effluents, including raw sewage.

II. Description of the Background

Economical and efficient methods and apparatus for purifying contaminated water, particularly water containing fatty acids, have long been sought. Many industrial facilities, particularly facilities plagued with fatty acid waste, have long sought improved methods for purifying wastewater. Similarly, isolated industrial facilities, e.g., offshore oil rigs and remotely located research facilities, have long sought economical, energy efficient methods for purifying wastewater. Finally, as the dangers of cancer caused by chlorinated organics have become more apparent, methods of purification using reduced levels of chlorine and chlorides have become more desirable.

The use of water-insoluble metal hydroxides, e.g., aluminum and iron hydroxides, to entrap and remove contaminants has long been known. These hydroxides have been produced by the dissolution of aluminum and iron sulfates and chlorides to produce flocculants which would coagulate and entrap colloids, colors, microbes, bacteria and other impurities. The entrapped contaminants could then be separated with the hydroxide flocculants by filtration. While removing the undesirable contaminants, these methods, however, undesirably increased the sulfate and chloride content of the water.

A method and apparatus for achieving the desired purification without increasing the chloride and sulfate content of the water was disclosed in U.S. Pat. No. 4,802,991 by Miller. The '991 patent illustrated and described a method of water purification wherein fatty acids contaminating the water are combined with metallic ions released from electrodes during electrolysis to form hydrophobic, metallic soaps. According to the process described by Miller, bivalent or trivalent metal ions released from electrodes during electrolysis combine with the fatty acids to form an insoluble flocculant. In order to ensure continuous production of ions, the electrodes in the apparatus disclosed by Miller were disposed in a moving bed of solid, inert particles. Those solid particles were kept in motion by the flow of process water through the electrolysis chamber in order to continuously abrade and clean the electrode surfaces.

The flocculant, in turn, entrained or absorbed other impurities present in the contaminated water. Thus, the flocculant served as a transport medium to remove not only fatty acids, but also other impurities from the water. The flocculant and entrained impurities were directed to a flocculation/separation basin where the flocculant and entrained impurities were separated by flotation, leaving purified water for withdrawal from the basin.

The method and apparatus described by Miller in the '991 patent, while technically elegant, found only limited use. Systems employing iron electrodes, while functional, proved unacceptable due to the difficulty in removing ferrous hydroxide from the purified water. Systems employing aluminum electrodes were found to be uneconomical due to the high cost for both electrodes and labor incurred for replacement of spent electrodes. Another disadvantage of the system described in the '991 patent was the tendency for partially consumed electrodes to break off and cause an electrical short circuit, thus preventing full use of the electrode and increasing the cost of operation considerably. Accordingly, use of the method and apparatus disclosed in the '991 patent was restricted to applications where other methods were cost prohibitive.

Another method and apparatus for achieving the desired purification were disclosed in U.S. Pat. No. 5,558,755 by Gardner-Clayson, et al. The '755 patent illustrated and described a method of water purification including a fluidized bed of metallic particles disposed between a pair of electrodes and through which the contaminated water was flowed. The electrodes were comprised of non-consumable materials so that they would not require frequent replacement. The particles, on the other hand, were comprised of a consumable metal which, under the influence of an applied electric charge, introduced metallic ions into the contaminated water at a rate sufficient to form the required hydrophobic, metallic soaps. Thus, the metallic particles, were used up in the process.

The '755 patent solved many of the problems which had prevented commercial use of the process disclosed in the '991 patent. The particles were relatively inexpensive and, more importantly, easily replenished without requiring an expensive shutdown of the system. The process disclosed in the '755 patent, however, suffered from the same difficulty in removing ferrous hydroxide from the purified water when iron particles were used as the consumable metal. The process also required the continuous application of an external electrical power source to drive the reaction. Accordingly, the method and apparatus disclosed in the '755 patent was not suitable for use in remote locations.

Thus, the water purification industry has continued to seek new and improved methods for removing contaminants, including fatty acids, from water without increasing the chloride or sulfate content of the water, without producing undesirable ferrous hydroxide and without requiring the input of a continuous electrical current. Accordingly, there has been a long felt but unfulfilled need for more economical, more efficient and more convenient methods for purifying water, particularly in remote locations. The present invention solves those needs.

SUMMARY OF THE INVENTION

The present invention is directed to methods for purifying wastewater using continuous flocculation and removal of contaminants by the in situ formation of water-insoluble metal hydroxides or soaps formed upon dissolution and oxidation of metal ions. The methods of the present invention are particularly useful for the purification of wastewater containing contaminants, e.g., colloids, colors, microbes and bacteria, which may be entrained and removed by-water-insoluble metal hydroxide flocculants. However, the methods of the present invention will remove other contaminants, e.g., fatty acids, other long-chain organic acids or oils, which form a metallic soap or other hydrophobic flocculant with the metal ions. Both the insoluble metal hydroxides and metallic soaps provide excellent means for entrapping or entraining other impurities and contaminants in the wastewater being treated. Because these methods do not require an external power source to produce in situ the insoluble metal hydroxides, they offer improved economics of operation. Further, they may be conveniently used to produce clean, purified water in remote locations. Further, because they do not introduce undesirable chlorides, sulfates, and ferrous hydroxides into the water, they provide more environmentally friendly purification methods.

The methods of the present invention broadly comprise providing a chamber for the in situ production of a water-insoluble metal hydroxide. The desired water-insoluble metal hydroxides and soaps are prepared in situ by the dissolution and oxidation of a metallic source.

In the presently most preferred embodiment, the chamber is provided with a fluidizable bed of consumable, similar metallic particles. While many metals will produce a suitable, water-insoluble metal hydroxide, multivalent metals that are heavier than sodium should be used. More preferred metals are aluminum, the alkaline earths and the transition metals. Still more preferred, however, for economic and environmental reasons are aluminum, calcium, magnesium, iron and alloys thereof. Most preferred are aluminum and iron.

In order to facilitate the gradual introduction into the water of solvated metallic ions, the surface of the particles must be maintained substantially free of oxides and other contaminants. The metallic particles may be fluidized by flowing upwardly therethrough the contaminated water to be treated. The continuous and random movement of the particles in the fluidized bed maintains the surface of the particles substantially free of oxides and other contaminants, thereby facilitating the gradual dissolution or introduction into the contaminated water of solvated metallic cations.

By also flowing a gas therethrough, the particles may be further fluidized. More importantly, the gas, whether pure oxygen or air, comprises oxygen to oxidize the solvated metallic ions to the water-insoluble metal hydroxide. Further, where the contaminated water includes fatty acids, e.g., carboxylic acids having about 8 to about 22 carbon atoms, insoluble metallic soaps will also be formed with the solvated metal ions.

Alternatively, the methods of the present invention employ consumable, solid metallic sources, e.g., rods or plates, disposed within the chamber. In this embodiment, the continuous cleaning of the surface of the rods is achieved by disposing about the rods a fluidizable bed of non-consumable particles, e.g., ceramic or glass beads, having a specific density greater than that of the water to be purified. The continuous and random movement of these particles provides the required motion to gently clean or abrade the surface of the rods or plates.

Finally, in the methods of the present invention, contaminants in the wastewater are agglomerated with the water-insoluble metal hydroxide and, optionally, the water-insoluble metallic soaps formed within the chamber. The contaminated water is flowed out of the chamber to an appropriate settling basin from which purified water is withdrawn. The water-insoluble metal hydroxides and the metallic soaps, if present, including other entrained contaminants, are then separated for appropriate disposal.

The methods of the present invention require no external power source nor do they introduce unwanted chloride or sulfate to the water. Introduction of oxygen prevents the formation of undesirable ferrous hydroxides when iron is used as the consumable metal. The methods of the present invention have solved the problems of the prior art. Thus, a long felt, but unfulfilled need for more economical and more efficient methods for purifying contaminated water, including methods useful in remote locations without an available electrical supply, has been met. These and other meritorious features and advantages of the present invention will be more fully appreciated from the following description and claims.

BRIEF DESCRIPTION OF THE DRAWINGS

Other features and intended advantages of the present invention will be more readily apparent by reference to the following description in connection with the accompanying drawings, wherein.

Figure 1:
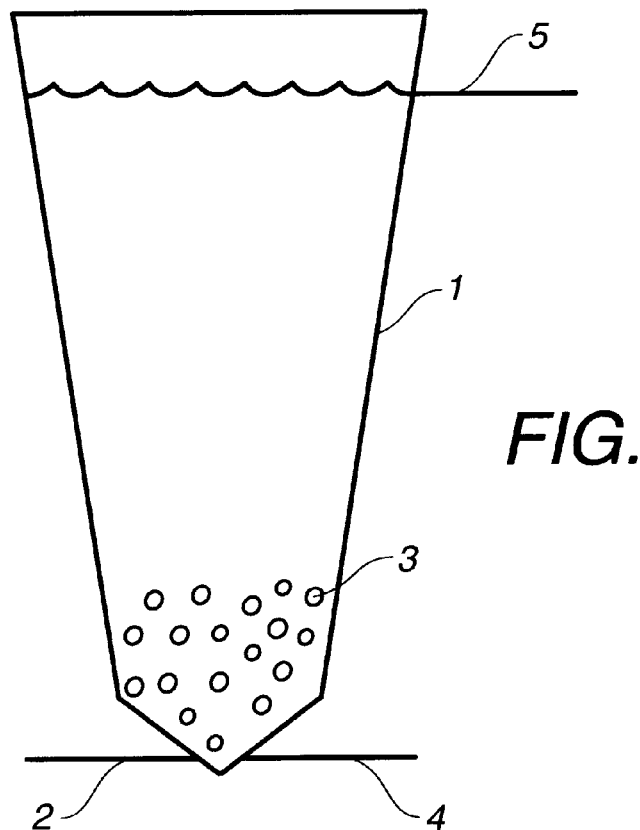
FIG. 1 is a schematic representation of the presently most preferred embodiment of a water purification system incorporating the methods of the present invention to produce in situ a water-insoluble metal hydroxide by the oxidation of cations dissolved from a fluidizable bed of consumable, metallic particles.

While the invention will be described in connection with the presently preferred embodiments, it will be understood that it is not intended to limit the invention to those embodiments. On the contrary, it is intended to cover all alternatives, modifications and equivalents as may be included in the spirit of the invention as defined in the appended claims.

DETAILED DESCRIPTION OF THE PREFERRED EMBODIMENTS

The present invention provides more efficient, more economical methods for purifying contaminated water. In the methods of the present invention a water-insoluble metal hydroxide is continuously formed in situ by the dissolution and oxidation of a metal source. The metal source is comprised of a plurality of particles, rods, plates or other solid shapes, all formed from a similar metal. The surfaces of those sources are maintained free of oxides or other contaminants which could interfere with the dissolution and oxidation of cations therefrom. An oxidizing agent, preferably oxygen, converts the metal in aqueous solution to the water-insoluble metal hydroxide.

The metal hydroxide, and any insoluble metallic soaps formed in the presence of any fatty acids in the contaminated water, entrap and entrain contaminants, including microbes and bacteria in the water. The agglomerated metal hydroxides, metallic soaps (if formed) and contaminants are then separated by conventional settling and separation methods to produce purified water. Because the methods of the present invention do not require an electrical input to drive the dissolution and oxidation, they can be conducted in an environment free of any applied or generated electrical current.

The methods of the present invention are based upon the dissolution and oxidation of metals, preferably aluminum and iron, to produce insoluble metal hydroxides. These reactions are exemplified by the following equations:

$$4M + 3O_2 + 6H_2O \rightarrow 4M(OH)_3 \downarrow \tag{1}$$

$$2M + O_2 + H_2O \rightarrow 2M(OH)_2 \downarrow \tag{2}$$

where M is a metal selected from the multivalent metals heavier than sodium which form insoluble hydroxides. Preferred metals are aluminum, the alkaline earths and the transition metals. More preferred, for economic and environmental reasons are aluminum, calcium, magnesium, iron and alloys thereof. Most preferred are aluminum and iron.

Because it is well known that these metals, particularly aluminum, are protected from corrosion by superficial oxide coatings, the methods of the present invention further require methods of removing or preventing the formation of those coatings to continuously expose fresh metal for oxidation. Thus, the methods of the present invention include both methods for continuously providing a clean metal surface and methods for dissolving and oxidizing the exposed metal to the insoluble metal hydroxide.

The methods of the present invention all begin with the step of providing a chamber for the in situ generation of a water-insoluble metal hydroxide. Within the chamber are disposed a plurality of consumable, similar sources of a metallic cation. The cation must be capable of forming a water-insoluble metal hydroxide. See, for example, the reactions in equations 1 and 2 above.

In order to facilitate the formation of the water-insoluble metal hydroxides, the surface of the metallic sources must be maintained substantially free of oxides and other contaminants which would interfere with the gradual dissolution and solvation of cations therefrom.

In the methods of the present invention, contaminated water is flowed through the chamber and over the metallic sources. The methods further include the step of flowing an oxidizing agent, preferably a gas comprising oxygen, into the contaminated water flowing through the chamber at a location to oxidize the dissolving cations to form the water-insoluble metal hydroxide. See the reactions set forth in equations 1 and 2 above. While pure oxygen may be employed, air is preferred for both economic and safety reasons. Use of a strong oxidizing agent prevents the formation of unwanted ferrous hydroxide when iron is the consumable metal.

Contaminants in the water, including pathogenic microbes and bacteria, will become entrapped as the water-insoluble metal hydroxides are formed. In the final step of the methods of the present invention, the agglomerated contaminants and water-insoluble metal hydroxides are separated by conventional methods to produce purified water. In the presently preferred methods, the water, including agglomerated contaminants and water-insoluble metal hydroxides, are flowed out of the chamber to an appropriate settling basin for separation and recovery of purified water by conventional methods.

The methods of the present invention do not require the input of an electrical current to effect the dissolution and oxidation of the metallic cations, thus these methods are advantageously performed in an environment free of an applied or generated electrical current.

In the presently most preferred embodiment the consumable, similar metallic sources of cations are provided by a fluidized bed of consumable, similar metallic particles disposed within the chamber. The bed is fluidized by the flow of both water and gas through the chamber. The surfaces of the particles are continuously cleaned and abraded by the random motion of the particles, thus maintaining the surfaces free of oxides or other contaminants which would interfere with the gradual dissolution and oxidation of cations therefrom. In the presently most preferred embodiment, the particles comprise iron or aluminum shot.

In a less preferred embodiment, the source of metallic cations comprises a plurality of consumable, similar metallic rods or plates disposed within the chamber. In this embodiment, the rods or plates are immersed in a fluidized bed of non-consumable, solid particles having a specific gravity greater than that of the contaminated water, e.g., ceramic or glass beads. Movement of these inert particles causes continuous and random contact with the surface of the rods or plates, thus maintaining the surface thereof substantially free of oxides or buildup of other interfering contaminants. Again, for economic and environmental reasons, iron or aluminum plates are preferred.

In order that the invention may be better understood, it will now be described with the presently most preferred embodiment illustrated in FIG. 1. Contaminated water enters conical chamber 1 through inlet conduit 2 located in a bottom portion of the chamber. Disposed within chamber 1 are a plurality of consumable metallic particles 3, all comprised of a similar metal which is capable of forming the desired, water-insoluble metal hydroxide.

Particles 3 are comprised of any consumable metallic pieces, trimmings, particles or shot of any suitable size or geometry. Spherical shot having a diameter of about 2 mm to about 6 mm comprised of aluminum or iron are preferred. As used herein and in the claims, the term consumable refers to a chemically active metal which may be dissolved and oxidized to produce the desired water-insoluble metal hydroxide at a rate sufficient to entrap and entrain contaminants from the water passing through chamber 1. Thus, the consumable metal is used up during the process and must be replenished from time to time. Examples of consumable metals include, but are not limited to, aluminum, the alkaline earths and the transition metals. More preferably the metals are selected from the group consisting of aluminum, calcium, magnesium and iron and from alloys of any one of those metals. Most preferably, both economically and environmentally, the metal is iron or aluminum in the form of iron or aluminum shot.

An oxidizing agent, preferably a gas capable of oxidizing the metallic cations to the desired water-insoluble metal hydroxide, is introduced near the bottom of chamber 1 through line 4 and an appropriate sparger (not shown). Both the gas introduced in gas line 4 and the water introduced in input line 2 should be introduced at a sufficient velocity to produce and maintain a fluidized bed from particles 3. While any appropriate oxidizing agent may be used, oxygen, delivered in the form of pure oxygen or air is preferred. For reasons of both safety and economy, air is the preferred gas.

Finally, water flowing through chamber 1, together with the generated water-insoluble metal hydroxides and agglomerated or entrapped contaminants is withdrawn from chamber 1 through outlet line 5. The water and agglomerated contaminants are conducted through outlet line 5 to a conventional settling basin (not shown) where the water-insoluble metal hydroxide, together with entrapped contaminants, are separated. Purified water is recovered from the settling basin.

If the contaminated water introduced into chamber 1 includes fatty acids, e.g., sewage water, the metallic cations produced from particles 3 will also react with any fatty acids present in the water to form insoluble metallic soaps. Those metallic soaps will further agglomerate and absorb other contaminants and may be separated, together with the water-insoluble metal hydroxides, from the purified water.

Figure 2:
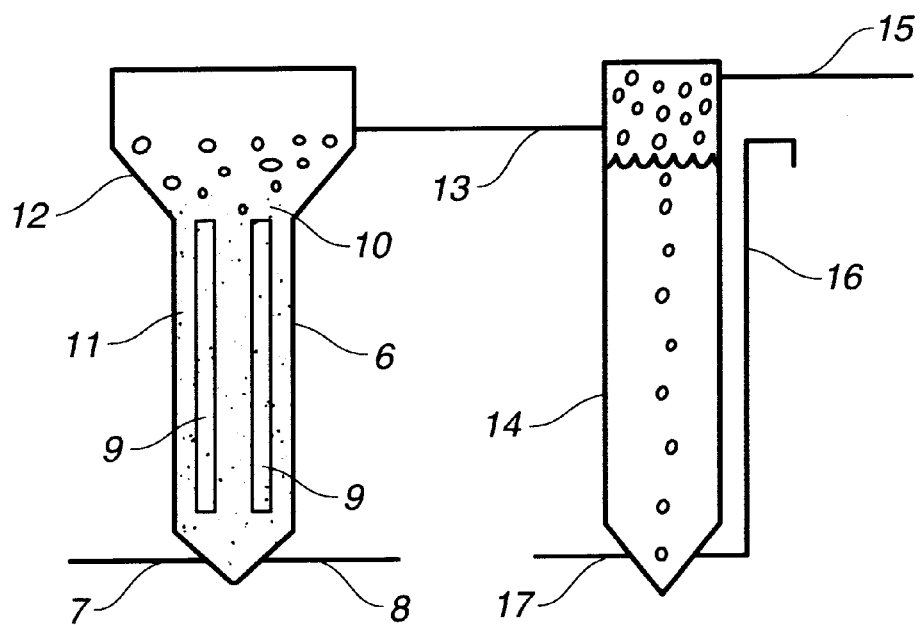
FIG. 2 is a schematic representation of an alternative water purification system incorporating the methods of the present invention wherein the cations are provided by the dissolution of metallic bars whose surfaces are continuously cleaned by the motion of a fluidized bed of non-consumable, solid particles.

FIG. 2 illustrates another, currently less preferred, embodiment of the present invention. In this embodiment, contaminated water is introduced to chamber 6 through input line 7 while the oxidizing agent, preferably air, is introduced through gas line 8.

Disposed within chamber 6 are a plurality of metallic plates 9 comprised of a similar, consumable metal. Plates 9 are comprised of the materials discussed above in conjunction with particles 3. Again, the preferred material is aluminum or iron, most preferably iron.

Also disposed within chamber 6 and about plates 9 are a plurality of non-consumable particles 11 forming a fluidized bed 10. Inert particles 11 are of any appropriate shape and size, such as discussed above in conjunction with particles 3, but, in contrast to consumable particles 3, are comprised of a non-consumable material. Inert particles 11 have a specific gravity greater than that of the contaminated water and preferably a hardness greater than that of consumable plates 9. Particularly suitable are ceramic or glass beads.

The water introduced from inlet line 7 and the gas introduced from gas line 8 are introduced at a velocity sufficient to impart motion to non-consumable particles 11, thus forming fluidized bed 10. The continuous movement of particles 11 around and against plates 9 provides the required cleaning action to maintain the surface of plates 9 substantially free of oxides and other contaminants. Chamber 16 is provided at its upper end with a conical portion 12. Because the fluid velocity within conical portion 12 is decreased, a disengagement space is produced, permitting particles 11 carried upwardly to fall back within fluidized bed 10.

Water, including contaminants agglomerated with the water-insoluble metal hydroxides, and, if present, insoluble metallic soaps, is withdrawn from chamber 6 through outlet line 13 and directed to a conventional froth separator 14. Froth, including the produced flocculants and agglomerated contaminants, is withdrawn via waste line 15 while purified water is withdrawn via line 16. In order to assist in the floatation or withdrawal of froth, air is bubbled into froth separator 14 via air line 17.

An advantage of the present invention lies in the fact that undesirable anions, e.g., chloride and sulfate, are not added to the water along with the metallic cations. Another significant advantage is the fact that it is not necessary to input energy in the form of an electrical current in order to form the desired water-insoluble metal hydroxides. Thus, the methods of the present invention may be conducted in an environment free of an applied or generated electrical current and are particularly adapted for use in remote locations, e.g., offshore drilling sites and remote research facilities where electrical energy is at a premium. Further, by introducing an oxidizing agent, preferably air, the formation of undesirable ferrous hydroxides is reduced or eliminated. Thus, cheaper iron shot or plates may be used as the consumable metal.

The foregoing description has been directed in primary part to particular preferred embodiments in accordance with the requirements of the Patent Statutes and for purposes of explanation and illustration. It will be apparent, however, to those skilled in the art that many modifications and changes in the specifically described methods and apparatus may be made without departing from the true spirit and scope of the invention. For example, the consumable particles 3 or plates 9, while preferably formed of iron or aluminum for economic and environmental reasons, may be formed of any multivalent metal which will produce a water-insoluble metal hydroxide and water-insoluble metallic soap. Further, while consumable particles 3 have been described as forming a fluidized bed, they may also form a spouting bed, plugged flow bed, transport bed or any other system so long as sufficient motion is present to maintain the surface thereof free of interfering oxides or other contaminants. Therefore, the invention is not restricted to the preferred embodiments described and illustrated, but covers all modifications which may fall within the scope of the following claims.

What is claimed is:

1. A method for purifying contaminated water, comprising:

providing a chamber for the in situ generation of a water-insoluble metal hydroxide;

providing a fluidizable bed of particles of said metal in said chamber;

flowing contaminated water through said chamber thereby fluidizing said bed;

flowing a gas comprising oxygen through said chamber and into contact with said particles thereby further fluidizing said bed;

in an environment free of an applied or generated electrical current, maintaining the surface of said particles substantially free of oxides and other contaminants thereby facilitating the gradual introduction into said water of solvated metal cations, said cations being oxidized by said gaseous oxygen to said water-insoluble metal hydroxide and forming water-insoluble metal soaps with any fatty acids present in said contaminated water;

agglomerating contaminants in said water with said water-insoluble metal hydroxide and, if formed, said water-insoluble metal soaps; and separating said agglomerated contaminants, said water-insoluble metal hydroxide and, if formed, said water-insoluble metal soaps to produce purified water.

2. The method of claim 1 wherein said particles are iron shot and said gas is air.

3. A method for purifying contaminated water, comprising:

providing a chamber for the in situ generation of a water-insoluble metal hydroxide, providing a fluidizable bed of particles of said metal in said chamber;

flowing contaminated water through said chamber thereby fluidizing said bed;

flowing an oxidizing agent through said chamber and into contact with said particles thereby further fluidizing said bed;

solvating metal ions from the surface of said particles in an environment free of an applied or generated electrical current;

oxidizing said solvated metal ions with said oxidizing agent to produce in situ a water-insoluble metal hydroxide;

agglomerating contaminants in said water with said water-insoluble metal hydroxide; and separating said agglomerated contaminants and water metal hydroxide to produce purified water.

4. The method of claim 3 wherein said oxidizing agent is oxygen.

5. The method of claim 4 wherein said particles are comprised of a metal selected from the group consisting of the elements aluminum, magnesium, iron and alloys of any one of said elements.

6. A method for purifying contaminated water, comprising:

providing a chamber having disposed therein a plurality of consumable sources of a metal cation, said cation capable of forming a water-insoluble metal hydroxide;

maintaining the surface of said sources substantially free of oxides and other contaminants which would interfere with the gradual dissolution of said sources;

flowing contaminated water through said chamber in an environment free of an applied or generated electrical current to produce dissolved cations from the gradual dissolution of said sources;

flowing an oxidizing agent into said water flowing through said chamber at a location so that oxygen reacts with said dissolved cations to form said water-insoluble metal hydroxide;

agglomerating contaminants in said water with said water-insoluble metal hydroxide; and separating said agglomerated contaminants and water-insoluble metal hydroxide to produce purified water.

7. The method of claim 6 further comprising flowing said contaminated water out of said chamber prior to said separating.

8. The method of claim 7 further comprising flowing said contaminated water into a settling chamber prior to said separating.

9. The method of claim 8 further comprising recovering said purified water from said settling chamber.

10. The method of claim 6 wherein said gas is selected from the group consisting of oxygen and air.

11. The method of claim 10 wherein said consumable sources are comprised of a metal selected from the group consisting of the elements aluminum, magnesium, iron and alloys of any one of said elements.

12. A method for purifying contaminated water, comprising:

providing a chamber for the in situ generation of a water-insoluble metal hydroxide from a plurality of consumable sources of a metal cation;

maintaining the surface of said sources substantially free of oxides or other contaminants which would interfere with the solvation of said metal cation from said surface;

flowing contaminated water through said chamber and over said sources to produce solvated cations of said metal in an environment free of applied or generated electrical current;

flowing an oxidizing agent into said water flowing through said chamber at a location so that said oxidizing agent can react with said solvated metal cations to form in situ said water-insoluble metal hydroxide;

agglomerating contaminants in said water with said water-insoluble metal hydroxide; and separating said agglomerated contaminants and water-insoluble metal hydroxide to produce purified water.

13. The method of claim 12 wherein said oxidizing agent is oxygen.

14. The method of claim 13 comprising providing a fluidized bed of consumable metal particles disposed within said chamber as said source of metal cations.

15. The method of claim 14 wherein said particles are comprised of a metal selected from the group consisting of the elements aluminum, magnesium, iron, and alloys of any one of said elements.

16. The method of claim 14 wherein said source of metallic cations is iron shot.

17. The method of claim 13 comprising providing a plurality of consumable, metal plates disposed within said chamber as said source of metal cations and further comprising disposing about said plates a fluidized bed of non-consumable, solid particles having a specific gravity greater than that of said contaminated water so that movement of said particles maintains the surface of said plates substantially free of oxides and other contaminants.

18. The method of claim 17 wherein said plates are comprised of a metal selected from the group consisting of the elements aluminum, magnesium, iron, and alloys of any one of said elements.

19. The method of claim 18 wherein said plates are iron plates.

* * * * *

UNITED STATES PATENT AND TRADEMARK OFFICE
CERTIFICATE OF CORRECTION

PATENT NO. : 6,177,016 B1
DATED : January 23, 2001
INVENTOR(S) : Jorge Miller; Luisa Kling Miller It is certified that error appears in the above-identified patent and that said Letters Patent is hereby corrected as shown below:

<u>Column 8,</u>
Line 38, replace "," with -- ; --.
Line 55, replace "water" with -- water-insoluble --.

<u>Column 10,</u>
Line 3, after "of" add -- an --.
Line 23, delete "metallic".

Signed and Sealed this

Sixteenth Day of October, 2001

*Attest:*

NICHOLAS P. GODICI
*Attesting Officer           Acting Director of the United States Patent and Trademark Office*